US009064677B2

(12) United States Patent
Uchiyama et al.

(10) Patent No.: US 9,064,677 B2

(45) Date of Patent: Jun. 23, 2015

(54) MICROCHANNEL PLATE

(71) Applicant: HAMAMATSU PHOTONICS K.K., Hamamatsu-shi, Shizuoka (JP)

(72) Inventors: Toshiyuki Uchiyama, Hamamatsu (JP); Yusuke Hayase, Hamamatsu (JP); Tetsuya Matsushita, Hamamatsu (JP)

(73) Assignee: HAMAMATSU PHOTONICS K.K., Hamamatsu-shi, Shizuoka (JP)

(*) Notice: Subject to any disclaimer, the term of this patent is extended or adjusted under 35 U.S.C. 154(b) by 70 days.

(21) Appl. No.: 13/895,395

(22) Filed: May 16, 2013

(65) Prior Publication Data

US 2013/0306867 A1 Nov. 21, 2013

Related U.S. Application Data

(60) Provisional application No. 61/648,764, filed on May 18, 2012.

(51) Int. Cl.

*G01J 1/00* (2006.01)
*G01T 1/00* (2006.01)
*H01J 43/04* (2006.01)
*H01J 43/24* (2006.01)

(52) U.S. Cl.

CPC ............... *H01J 43/04* (2013.01); *H01J 43/246* (2013.01)

(58) Field of Classification Search

CPC ........................................................ H01J 43/04
USPC ................... 250/336.1, 483.1, 281, 305, 307, 250/214 VT; 313/103 CM
See application file for complete search history.

(56) References Cited

U.S. PATENT DOCUMENTS

| | | | | |
|---|---|---|---|---|
| 3,979,621 | A | | 9/1976 | Yates |
| 3,979,637 | A | | 9/1976 | Siegmund |
| 4,737,013 | A | * | 4/1988 | Wilcox ........................ 385/120 |
| 4,912,314 | A | | 3/1990 | Sink |
| 5,493,169 | A | * | 2/1996 | Pierle et al. ............ 313/103 CM |
| 6,040,000 | A | * | 3/2000 | Floryan et al. .................. 427/78 |
| 6,311,001 | B1 | | 10/2001 | Rosine |
| 6,876,802 | B2 | | 4/2005 | Rosine et al. |
| 6,917,144 | B2 | | 7/2005 | Batista et al. |

(Continued)

FOREIGN PATENT DOCUMENTS

| | | |
|---|---|---|
| JP | 63-128544 A | 6/1988 |
| JP | 2001-351509 | 12/2001 |

(Continued)

OTHER PUBLICATIONS

English-language translation of International Preliminary Report on Patentability (IPRP) dated Nov. 27, 2014 that issued in WO Patent Application No. PCT/JP2013/063193.

(Continued)

*Primary Examiner* — David Porta
*Assistant Examiner* — Meenakshi Sahu
(74) *Attorney, Agent, or Firm* — Drinker Biddle & Reath LLP

(57) ABSTRACT

The present invention relates to an MCP with sufficient physical strength and high detection efficiency. The MCP has a double cladding structure composed of first cladding glasses each of which has a through hole serving as a channel, and a second cladding glass having a high acid resistance and employing a honeycomb structure. In an entrance end face each first cladding glass has a tapered opening.

23 Claims, 10 Drawing Sheets

(56) References Cited

U.S. PATENT DOCUMENTS

| | | | | |
|---|---|---|---|---|
| 7,221,837 | B2 | 5/2007 | Mabry | |
| 7,855,493 | B2 | 12/2010 | Sullivan et al. | |
| 7,977,617 | B2 | 7/2011 | Sullivan et al. | |
| 7,990,032 | B2 | 8/2011 | Downing et al. | |
| 8,878,128 | B2 | 11/2014 | Uchiyama et al. | |
| 2002/0005484 | A1 * | 1/2002 | Nishimura | 250/310 |
| 2004/0005433 | A1 | 1/2004 | Iguchi et al. | |
| 2005/0211894 | A1 | 9/2005 | Laprade | |
| 2009/0215211 | A1 | 8/2009 | Tremsin et al. | |
| 2010/0044577 | A1 | 2/2010 | Sullivan et al. | |
| 2013/0306852 | A1 * | 11/2013 | Uchiyama et al. | 250/281 |
| 2013/0313422 | A1 * | 11/2013 | Uchiyama et al. | 250/281 |

FOREIGN PATENT DOCUMENTS

| | | | |
|---|---|---|---|
| JP | 2002-117801 | | 4/2002 |
| JP | 2005-536028 | | 11/2005 |
| JP | 2006-507646 | | 3/2006 |
| JP | 4356996 | B2 | 11/2009 |
| JP | 2011-129362 | | 6/2011 |
| WO | WO 2006/030820 | | 3/2006 |
| WO | WO 2009/148643 | | 12/2009 |
| WO | WO 2010/036429 | | 4/2010 |

OTHER PUBLICATIONS

English-language translation of International Preliminary Report on Patentability (IPRP) dated Nov. 27, 2014 that issued in WO Patent Application No. PCT/JP2013/063679.

English-language translation of International Preliminary Report on Patentability (IPRP) dated Nov. 27, 2014 that issued in WO Patent Application No. PCT/JP2013/063204.

U.S. Office Action dated Feb. 4, 2014 that issued in U.S. Appl. No. 13/894,868.

U.S. Notice of Allowance dated Jul. 9, 2014 that issued in U.S. Appl. No. 13/894,868.

U.S. Office Action dated Nov. 6, 2014 that issued in U.S. Appl. No. 13/895,534.

* cited by examiner 14
16
18
12

20
12
12

22
10

26
24
10

26

26

28

28

28B
$H_2$

MICROCHANNEL PLATE

This application claims the benefit of U.S. Provisional Application No. 61/648,764 filed May 18, 2012, which is incorporated by reference herein in its entirety.

BACKGROUND OF THE INVENTION

1. Field of the Invention

The present invention relates to a microchannel plate (which will be referred to hereinafter as MCP) used in an image intensifier, an ion detector, and inspection equipment including the ion detector, e.g., such as a mass spectrometer, a photoelectron spectrometer, an electron microscope, or a photomultiplier tube.

2. Related Background Art

A microchannel plate (MCP) has a plate-like structural body (main body) and is known as an electron multiplier in which a plurality of channels are regularly arranged. FIG. 1A is a partly broken drawing showing a structure of a typical MCP (single cladding structure) and FIG. 1B a drawing for explaining an example of use of the MCP.

More specifically, the conventional MCP 6 is a thin disk-shaped structural body (main body) containing lead glass as a major component, in which a large number of small-diameter holes 62 penetrating in the thickness direction are arranged except for an annular periphery 61 and in which electrodes 63 are formed on both sides of the structural body by evaporation. The electrodes 63 are not formed so as to cover the entire surface of MCP 6 but formed so as to expose the periphery 61 of MCP 6 in a region of 0.5 mm to 1.0 mm from the outer edge.

In the MCP 6, as shown in FIG. 1B, the input-side electrode 4 (electrode 63) and output-side electrode 7 (electrode 63) are arranged on the front side and on the back side, respectively, and a predetermined voltage is applied between them by a power supply 15, whereby, when an inner wall (channel wall) defining a hole 62 is bombarded by a charged particle 16 such as an electron or an ion incident into the hole 62, the inner wall emits secondary electrons. This process results in multiplying the incident electron or the like. An aspect ratio of channel (=L/D) is given by the length L of the hole 62 serving as a channel, and the diameter D (channel diameter) of the hole 62.

Particularly, in recent years, there are increasing needs for improvement in detection efficiency of the MCP having the above-described structure.

SUMMARY OF THE INVENTION

The Inventors conducted detailed research on the conventional microchannel plate (MCP) and found the problem as discussed below.

Specifically, since the detection efficiency of an MCP is generally proportional to an open area ratio of channels in the MCP, it is most effective to increase the channel open area ratio in the MCP, for meeting the foregoing needs for improvement in detection efficiency. There was, however, the problem that the increase of the channel open area ratio resulted in decrease of the volume of the structural body itself separating the channels, so as to reduce the physical strength of the MCP.

An attempt to increase the channel open area ratio only near an entrance end face by etching (to process opening ends of channels in taper shape) has been conducted heretofore as a solution to the above problem. Since this solution expands the channel openings only near the entrance end face of the MCP, it seems possible to improve the detection efficiency while ensuring the physical strength of the MCP. However, no optimum technology has been established heretofore yet.

For example, in the case of the single cladding type MCP, attempts to devise an etching method and an etchant have been conducted so as to form optimum openings. In the single cladding type MCP of this kind, however, it was difficult to suppress etching unevenness and channel defects and to apply this technique, particularly, to large-scale MCPs. On the other hand, there are double cladding type MCPs of a known structure using cladding glasses having different acid resistances. Namely, the known structure is such that the acid resistance of an inside cladding glass having a through hole serving as a channel is set lower than that of an outside cladding glass, thereby to facilitate the etching process of openings. However, the outside cladding glass is less likely to be etched while the inside cladding glass has the shape which has been believed to be optimum heretofore, and thus it is difficult to ensure a satisfactory open area ratio. Therefore, it was difficult to obtain an MCP with tapered openings of satisfactory quality.

The present invention has been accomplished in order to solve the problem as described above and it is an object of the present invention to provide an MCP with high detection efficiency and with sufficient physical strength ensured, and application apparatus thereof.

A microchannel plate (MCP) according to the present invention is a sensing device comprised of lead glass which exhibits electric insulation before a reduction treatment and exhibits electric conduction after the reduction treatment. In order to achieve the above object, the MCP employs a double cladding structure composed of two types of cladding glasses having different chemical properties.

As a first aspect of the present invention, a main body of the MCP comprises: a plurality of first cladding glasses each having a predetermined acid resistance; and a second cladding glass having an acid resistance higher than that of the first cladding glasses. As a second aspect of the present invention, the MCP further comprises a coating material comprised of a high-δ substance, which is provided on an entrance end face of the MCP, in addition to the first cladding glasses and the second cladding glass. In the first and second aspects, each of the first cladding glasses has a through hole extending along a predetermined direction and defining a channel, and an inner wall surface of the through hole functions as a channel wall (secondary electron emitting layer). The second cladding glass is a member that fills gaps among the first cladding glasses arranged as separated by a predetermined distance from each other. Therefore, the second cladding glass is located at least in part in spaces among outer peripheral surfaces of the first cladding glasses in a state in which the second cladding glass is in contact with the outer peripheral surfaces of the respective first cladding glasses.

Particularly, in the first and second aspects, an opening end of the through hole in each of the first cladding glasses is processed in a taper shape, on the entrance end face side of the MCP. This structure makes it possible to increase the channel open area ratio in the entrance end face (or to improve the detection efficiency). In the first and second aspects, it becomes feasible to stabilize an electric field near the entrance end face. Furthermore, in a cross section of the MCP perpendicular to the predetermined direction, outer peripheries of the first cladding glasses are deformed in a hexagonal shape whereby the second cladding glass constitutes a honeycomb structure. As the honeycomb structure is employed for the second cladding glass in this manner, it becomes feasible to drastically improve the channel open area ratio in the entrance end face while ensuring the physical strength of the MCP itself, and thereby to achieve high detection efficiency. As the second aspect, on the entrance end face of the MCP, the coating material covers at least a part of the tapered opening of the through hole in each of the first cladding glasses in a state in which the coating material covers an entire end face of the second cladding glass. This structure makes it feasible to further improve the detection efficiency.

As a third aspect applicable to at least either of the above first and second aspects, an area ratio of the first cladding glasses in the entrance end face of the main body is larger than an area ratio of the second cladding glass in the entrance end face. More specifically, as a fourth aspect applicable to at least any one of the above first to third aspects, an area ratio before a tapering process of the first cladding glasses in the entrance end face of the main body is in the range of 60% to 90%. The entrance end face refers to an entrance-side effective surface of the glass main body contributing to electron multiplication, where the channel openings are arranged, and the area ratio of each part in the entrance end face refers to an area ratio in a state before the tapering process for the channel openings. Furthermore, the area ratio of each part in the entrance end face refers to an area ratio of only a glass region excluding regions corresponding to spaces defined by inner walls of the first cladding glasses.

As a fifth aspect applicable to at least any one of the above first to fourth aspects, a taper angle, which is defined as an angle between a central axis of the through hole for defining a channel, and a tapered face located at an opening end of the through hole, is preferably in the range of 10° to 50°.

Furthermore, as a sixth aspect applicable to at least any one of the above first to fifth aspects, the high-δ substance preferably contains any one of MgO, $MgF_2$, $Al_2O_3$, $SiO_2$, CsI, KBr, SrO, $Y_2O_3$, $B_2O_3$, and NaCl. Particularly, MgO, $MgF_2$, $Al_2O_3$, $SiO_2$, and NaCl are suitable for detection of electrons, ions, and so on, and CsI, KBr, SrO, $Y_2O_3$, and $B_2O_3$ are suitable for detection of ultraviolet light, radiation, and X-rays.

In a seventh aspect applicable to at least any one of the above first to sixth aspects, as any one of a resistance to hydrochloric acid, a resistance to nitric acid, a resistance to sulfuric acid, a resistance to phosphoric acid, a resistance to a mixture solution of at least two of these hydrochloric acid, nitric acid, sulfuric acid, and phosphoric acid, a resistance to hydrogen fluoride, and a resistance to a compound of hydrogen fluoride, the acid resistance before the reduction treatment of the second cladding glass is set higher than the acid resistance before the reduction treatment of the first cladding glasses.

The MCP constructed according to at least any one of the first to seventh aspects as described above, or according to a combination of these aspects (i.e., the MCP according to the present invention) is applicable to a variety of sensing devices.

For example, as an eighth aspect, the MCP constructed according to at least any one of the above first to seventh aspects, or according to a combination of these aspects is applicable to an image intensifier. As a ninth aspect, the MCP constructed according to at least any one of the above first to seventh aspects, or according to a combination of these aspects is applicable to an ion detector. Furthermore, as a tenth aspect, the ion detector according to the ninth aspect is applicable to a variety of inspection equipment. As an eleventh aspect applicable to at least any one of the ninth and tenth aspects, the inspection equipment to which the ion detector of the ninth aspect is applied includes, for example, a mass spectrometer, a photoelectron spectrometer, an electron microscope, or a photomultiplier tube.

As an example, the mass spectrometer comprises an ionization unit to ionize a specimen, an analysis unit to separate the specimen ionized by the ionization unit, into ions according to a mass charge ratio, and an ion detection unit to detect the ions having passed the analysis unit. This ion detection unit includes the MCP constructed according to at least any one of the above first to seventh aspects, or according to a combination of these aspects, as the ion detector according to the eleventh aspect.

Each of embodiments according to the present invention will become more fully understood from the detailed description given hereinbelow and the accompanying drawings. These examples are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, and that various modifications and improvements within the spirit and scope of the invention will become apparent to those skilled in the art from this detailed description.

DETAILED DESCRIPTION OF THE EMBODIMENTS

Each of embodiments of the microchannel plate (MCP) according to the present invention will be described below in detail with reference to the accompanying drawings. In the description of the drawings, the same portions or the same elements will be denoted by the same reference signs, without redundant description.

Figure 1A:
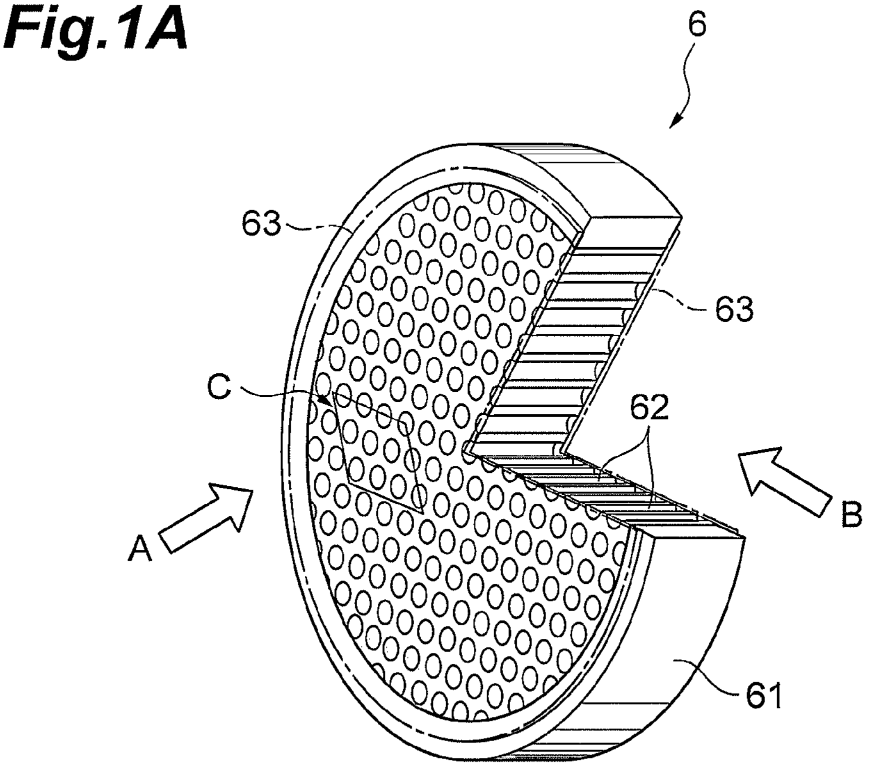
FIG. 1A is a partly broken view showing a structure of a typical MCP (single cladding structure), and FIG. 1B a drawing for explaining an example of use of the MCP.
Figure 2A:
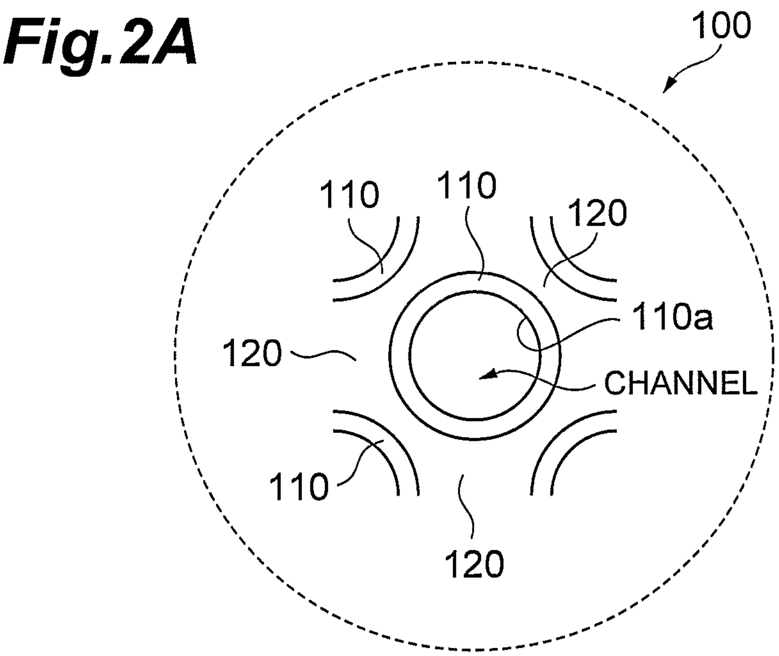
FIG. 2A is a drawing for explaining a structure near a channel in an MCP having a general double cladding structure, and FIG. 2B a drawing for explaining a structure near a channel in an MCP according to the present embodiment.
Figure 2B:
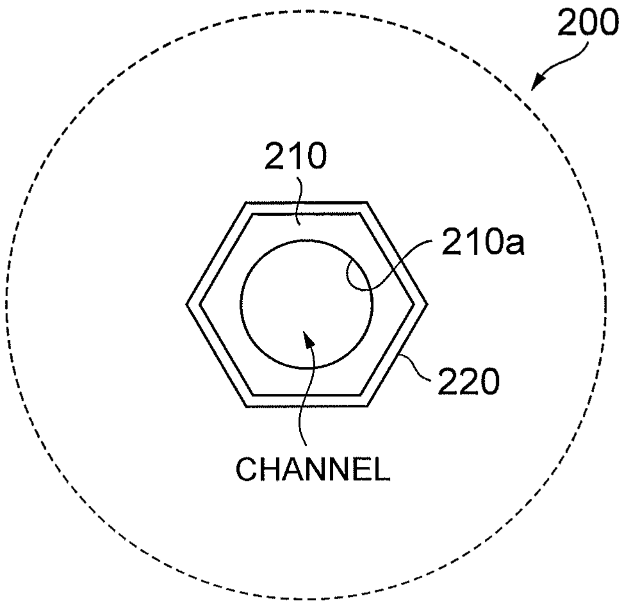
Figure 3A:
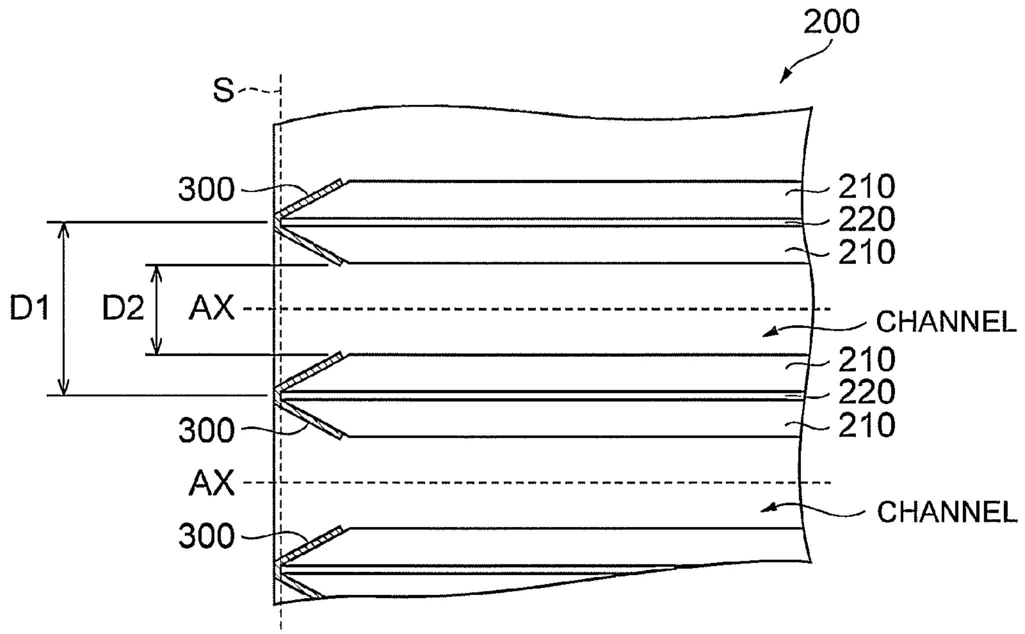
FIGS. 3A and 3B are drawings showing a sectional structure near an entrance end face (or near opening ends of channels), of the MCP according to the embodiment.
Figure 3B:
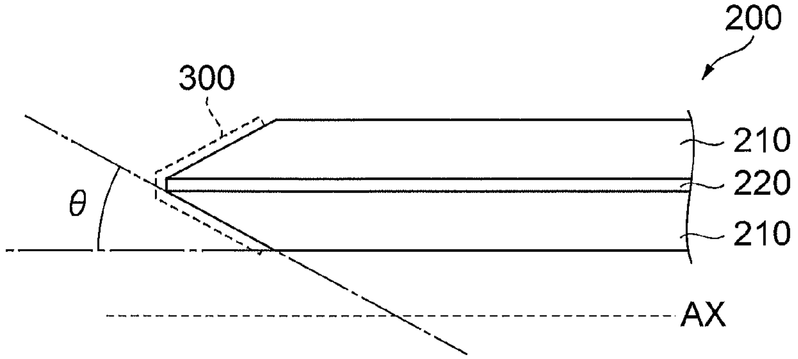
Figure 4A:
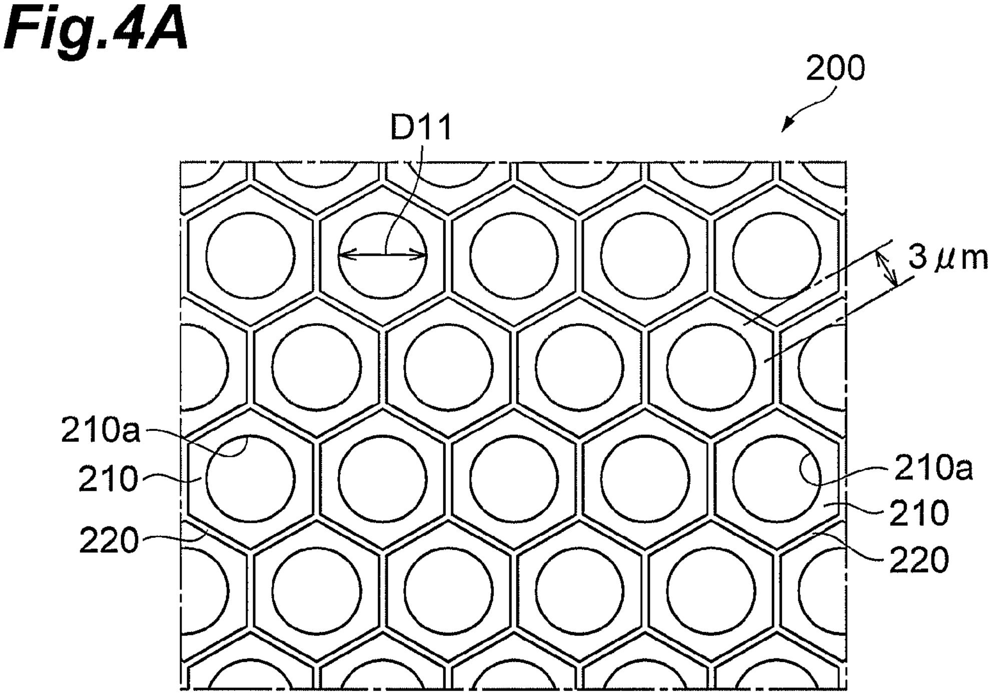
FIGS. 4A and 4B are drawings showing a planar structure of the MCP according to the present embodiment, corresponding to a part of the MCP (region indicated by arrow C) as viewed from a direction indicated by arrow A in FIG. 1A.
Figure 4B:
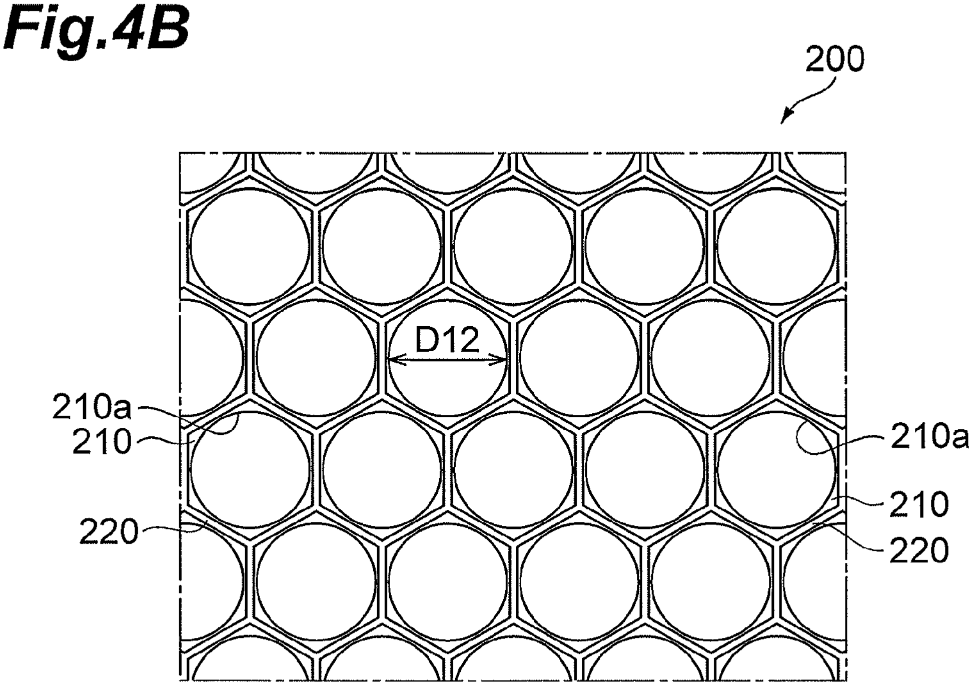

FIG. 2A is a drawing for explaining a structure near a channel in an MCP having a general double cladding structure, and FIG. 2B a drawing for explaining a structure near a channel in an MCP according to the present embodiment. FIGS. 3A and 3B are drawings showing a sectional structure of the MCP as viewed from a direction indicated by arrow B in FIG. 1A (particularly, near opening ends of respective channels). FIGS. 4A and 4B are drawings showing a planar structure of the MCP according to the present embodiment, corresponding to a part of the MCP (region indicated by arrow C) as viewed from a direction indicated by arrow A in FIG. 1A.

Figure 1B:
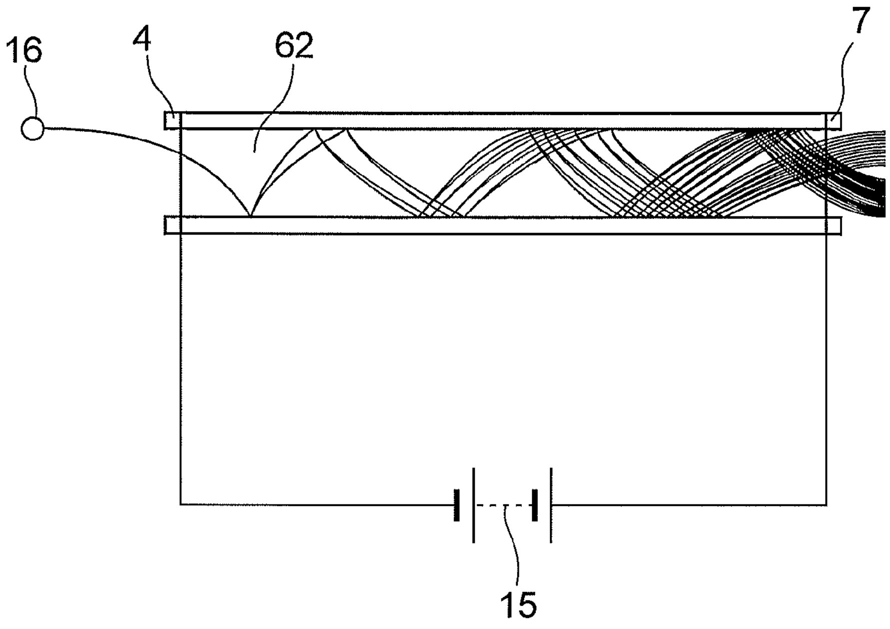

The MCP according to the present embodiment is an electron multiplier having the main body comprised of lead glass which exhibits electric insulation before a reduction treatment and exhibits electric conduction after the reduction treatment, and its basic structure resembles the structure of the MCP 6 shown in FIGS. 1A and 1B. However, the MCP of the embodiment is different in the structure of the main body (structural body) in which a plurality of holes defining respective channels are formed, from the MCP 6 shown in FIGS. 1A and 1B. Namely, the structural body of the MCP 6 has the single cladding structure, whereas the main body of the MCP of the embodiment has the double cladding structure.

Furthermore, the MCP 100 having the general double cladding structure, as shown in FIG. 2A, is provided with first claddings 110 (first cladding glasses) an inner wall 110*a* of each of which functions as a channel wall, and a second cladding 120 which is directly provided on outer peripheries of the first claddings 110 (cladding glasses). In the MCP 100, the first cladding glasses 110 have so low acid resistance as to facilitate a tapering process of the opening ends of the respective channels by etching. The second cladding 120 has so high acid resistance as not to be etched by an etchant, in order to maintain the physical strength of the MCP 100. In the MCP, since the first claddings 110 are annular, the thickness of the second cladding 120 located around them is naturally not constant. For this reason, even if the tapering process is completed for the opening ends of the respective channels on the entrance end face side of the MCP 100, an increase in the open area ratio of channels will be inevitably limited.

On the other hand, the MCP 200 of the embodiment shown in FIG. 2B is provided with first claddings 210 (first cladding glasses) an inner wall 210*a* of each of which functions as a channel wall, and a second cladding 220 (second cladding glass) which is directly provided on outer peripheries of the first claddings 210. In the MCP 200, as in the MCP 100, the first cladding glasses 210 have so low acid resistance as to facilitate the tapering process of the opening ends of the respective channels by etching. The second cladding 220 has so high acid resistance as not to be etched by an etchant, in order to maintain the physical strength of the MCP 200. Furthermore, in the MCP 200, outer peripheries of the first claddings 210 are deformed in a hexagonal shape whereby the second cladding 220 constitutes a honeycomb structure.

FIGS. 3A and 3B are drawings (corresponding to the cross section as viewed from arrow B in FIG. 1A) showing the sectional structure near the entrance end face (or near the opening ends of the channels), of the MCP 200 according to the embodiment.

As shown in FIG. 3A, the opening ends of the first claddings 210 (the opening ends of the respective channels) are etched near the entrance end face S of the MCP 200, to increase the channel open area ratio in the entrance end face. In this case, an aperture diameter D1 of each channel in the entrance end face becomes larger than a channel diameter D2 of the other part. For this reason, the detection efficiency improves while the physical strength of the MCP 200 itself is maintained. On the entrance end face S of the MCP 200, there is a coating material 300 of a high-δ substance provided so as to cover an end face of the second cladding 220, which becomes coincident with the entrance end face S after the first claddings 210 are etched in the taper shape, and portions of the tapered faces in the first claddings 210. The high-δ substance preferably contains any one of MgO, $MgF_2$, $Al_2O_3$, $SiO_2$, CsI, KBr, SrO, $Y_2O_3$, $B_2O_3$, and NaCl. Particularly, MgO, $MgF_2$, $Al_2O_3$, $SiO_2$, and NaCl are suitable for detection of electrons, ions, and so on, and CsI, KBr, SrO, $Y_2O_3$, and $B_2O_3$ are suitable for detection of ultraviolet light, radiation, and X-rays.

A taper angle θ of the opening end of each channel, after etched, is preferably in the range of 10° to 50°. The taper angle θ is defined, for example as shown in FIG. 3B, as an angle between a central axis AX of a channel (which agrees with a central axis of a through hole provided in the first cladding 210) and the tapered face at the opening end of the channel. The taper angle θ is 30° in samples of MCP 200 which will be described below.

FIGS. 4A and 4B are drawings showing the planar structure of the MCP according to the present embodiment, corresponding to a part of the MCP (region indicated by arrow C) as viewed from the direction indicated by arrow A in FIG. 1A.

In the planar structure shown in FIG. 4A, the channel diameter defined by the inner wall 210*a* of the first cladding 210 is D11. On the other hand, in the planar structure shown in FIG. 4B, the channel diameter is D12 larger than D11. In the MCP 200 of the present embodiment, the channel open area ratio can be made remarkably larger than in the structure shown in FIG. 2A because the second cladding 220 constitutes the honeycomb structure, as described above.

In addition, as shown in FIG. 2B, the shape of the boundary between the first cladding 210 and the second cladding 220 is hexagonal whereby the second cladding 220 as a main electroconductive part comes to have the constant width. In this case, the current density becomes uniform in the electroconductive part and thus charge can be supplied in just proportion everywhere in the MCP. For the second cladding 220 to constitute the honeycomb structure as shown in FIGS. 4A and 4B, the viscosities defined at the respective sag temperatures (deformation points) of the first claddings 210 and the second cladding 220 are preferably equal or close to each other.

For improving the detection efficiency by the increase of the channel open area ratio, in the entrance end face S of the MCP 200, an area ratio before etching of the first claddings 210 in the entrance end face S (an area ratio of a glass region excluding regions of the channel openings) is preferably larger than an area ratio of the second cladding 220 in the entrance end face S. Specifically, the area ratio before etching of the first claddings 210 in the entrance end face S is preferably in the range of 60% to 90%.

A manufacturing method of the MCP 200 according to the present embodiment will be described below based on FIGS. 5A to 5I. The method described hereinafter is an example of the MCP 200 of a circular cross section, MFs 10 having a regular hexagonal cross section, and use of an acid solution (e.g., $HNO_3$ or HCl).

Figures 5A, 5B, 5C, 5D, 5E, 5F, 5G, 5H, 5I:
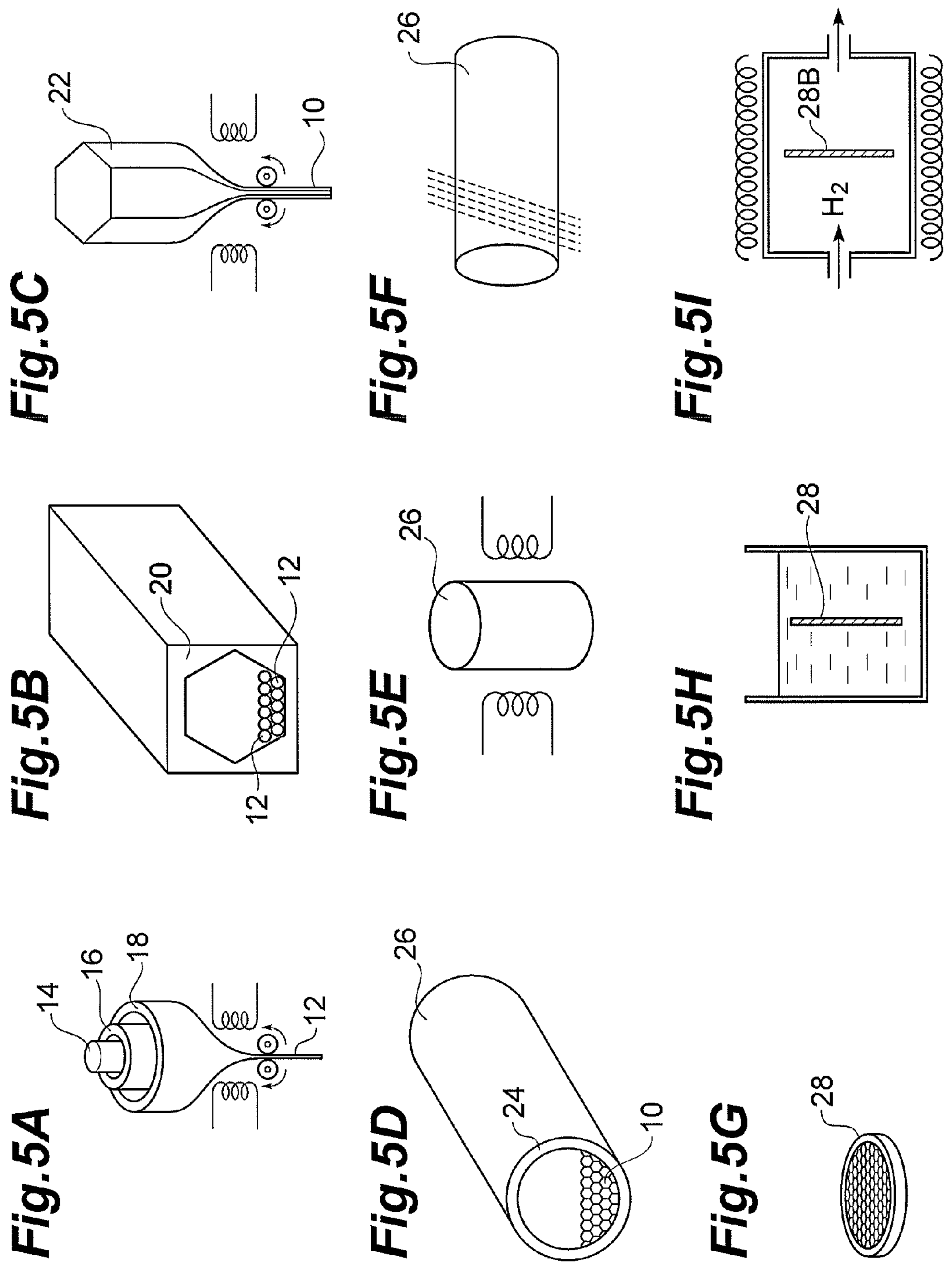
FIGS. 5A to 5I are drawings for explaining a manufacturing method of a double cladding structure of MCP according to the present embodiment.
Figure 6:
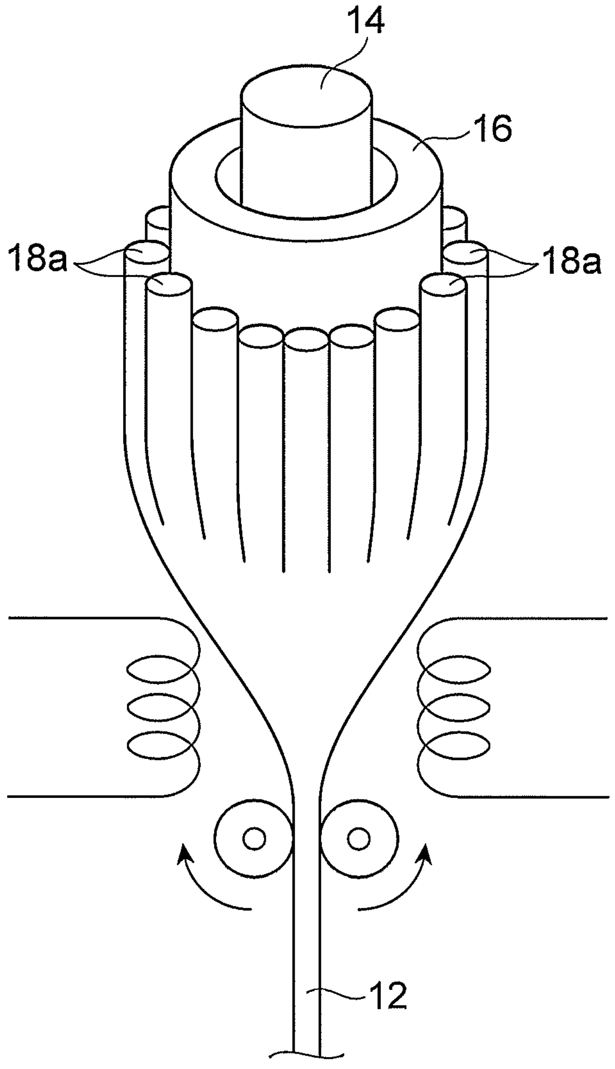
FIG. 6 is a drawing for explaining another forming method of channel fibers different from the forming method shown in FIG. 5A.
Figure 7A:
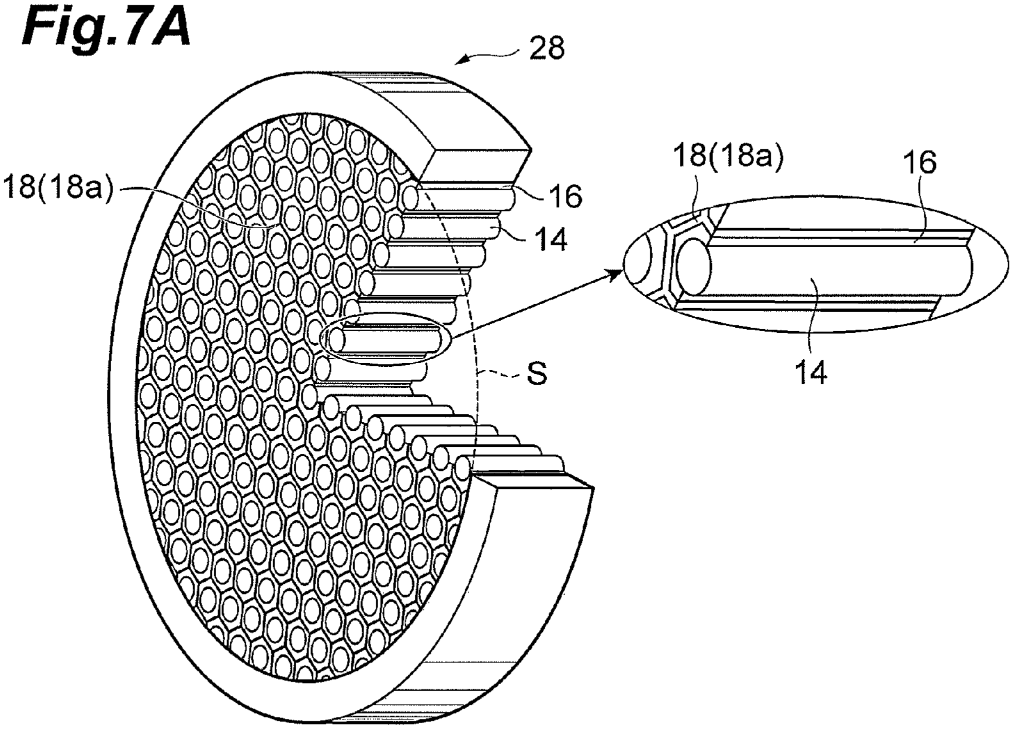
FIG. 7A is a partly broken view showing a sectional structure of MCP 28 before channel formation shown in FIG. 5G (which corresponds to the partly broken view shown in FIG. 1A), and FIG. 7B a partly broken view of MCP 28A after the channel formation (which corresponds to the partly broken view shown in FIG. 1A)
Figure 7B:
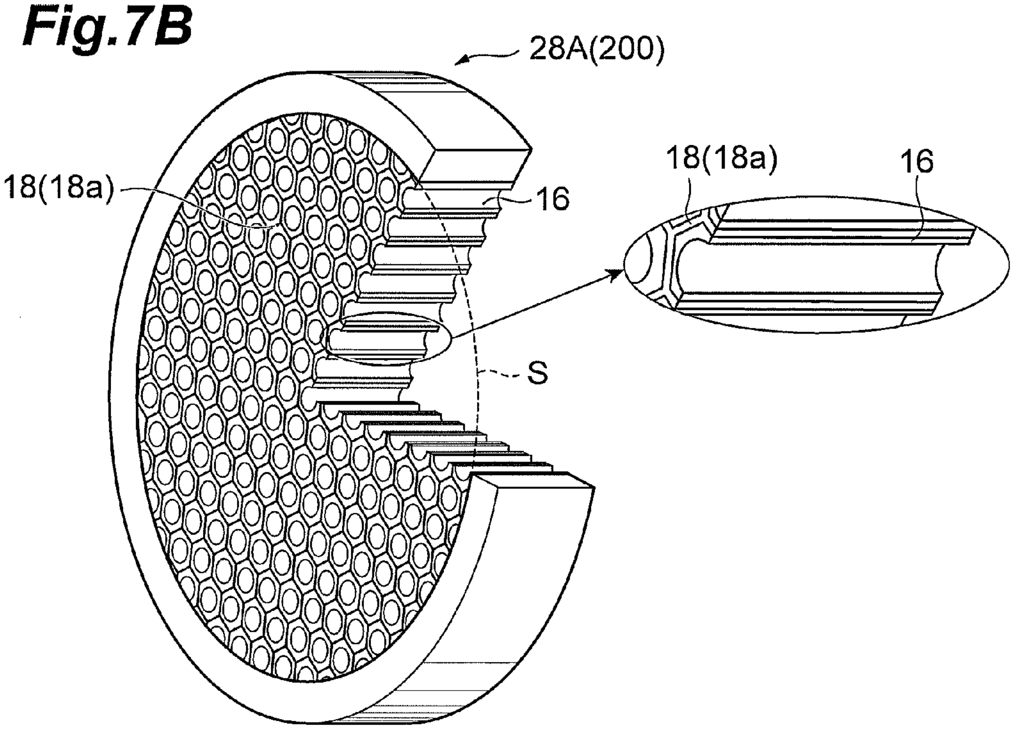

FIG. 6 is a drawing for explaining another forming method of channel fibers different from the forming method shown in FIG. 5A. FIG. 7A is a partly broken view showing a sectional structure of MCP 28 before channel formation shown in FIG. 5G (which corresponds to the partly broken view shown in FIG. 1A), and FIG. 7B a partly broken view of MCP 28A after the channel formation (which corresponds to the partly broken view shown in FIG. 1A).

First, a manufacturing method of MFs (multi-fibers) 10 will be described. FIG. 5A is a drawing showing a method for forming a channel fiber (first fiber) 12 in which a channel can be formed by a coring process. According to the same drawing, the channel fiber 12 is one obtained by inserting a core part (central portion) 14 made of a first glass material that is soluble in an acid used, into a cladding part (peripheral portion) 16 made of a second glass material that is insoluble in the same acid, and drawing these into fiber under heat. For forming the fiber in the double cladding structure, a cladding part 18 made of a third material that is insoluble in the same acid is further formed on the outer periphery of the cladding part 16. This cladding part 18 may be a tube that can house the cladding part 16 inside, or may be a large number of glass rods 18*a* surrounding the cladding part 16 as shown in FIG. 6. The cladding part 16 of this channel fiber 12 corresponds to the first cladding 210 of MCP 200 obtained finally, and the cladding part 18 or the large number of glass rods 18*a* to the second cladding 220.

Subsequently, as shown in FIG. 5B, channel fibers 12 are stacked and arrayed in a predetermined pattern in parallel and in close contact in a mold 20 having a hollow cross section of a regular hexagon. Thereafter, the channel fibers 12 arrayed in the mold 20 are heated to be bonded to each other, and then cooled, and thereafter the mold 20 is removed. This step results in obtaining an MF preform 22 having a regular hexagonal cross section. Next, as shown in FIG. 5C, the MF preform 22 is drawn again under heat, to form MF 10. On that occasion, the preform 22 is drawn so as to form the MF 10 in the regular hexagonal cross section. The MF 10 may be formed by further stacking and arraying MFs obtained in this step, in a mold and drawing them. This step may be repeated until a desired channel diameter is achieved.

A manufacturing method of an MCP rod and the MCP 200 using a plurality of MFs 10 will be described below.

First, as shown in FIG. 5D, a plurality of obtained MFs 10 are arrayed inside a glass tube 24.

Subsequently, the MFs 10 arrayed inside the glass tube 24 are heated to be bonded to each other under pressure, obtaining an MCP preform 26 (cf. FIG. 5E). Thereafter, as shown in FIGS. 5F and 5G, the MCP preform 26 is sliced in a predetermined thickness and at a predetermined angle, and the resulting slice is subjected to surface polishing, obtaining an MCP slice 28. FIG. 7A is a drawing showing a sectional structure of the MCP slice 28. In this MCP slice 28, core parts 14 remain at positions to become the channels.

Furthermore, the coring process is carried out by immersing the MCP slice 28 in an acid solution, as shown in FIG. 5H. At this time, the core parts 14 of the channel fibers 12 are dissolved out in the acid because they are made of the first glass material soluble in the acid. On the other hand, the cladding part 16 and the cladding part 18 remain undissolved because they are made of the second glass material and the third glass material insoluble in the acid. For this reason, the channels 6 are formed by dissolution of the core parts 14. The coring process forms a secondary electron emitting layer containing $SiO_2$ as a major component on a surface of each channel 6. The coring process described above results in obtaining an MCP slice 28A shown in FIG. 7B.

Figure 8A:
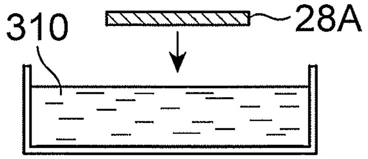
FIGS. 8A to 8C are drawings for explaining a tapering method of channel openings in the double cladding MCP according to the present embodiment.
Figure 8B:
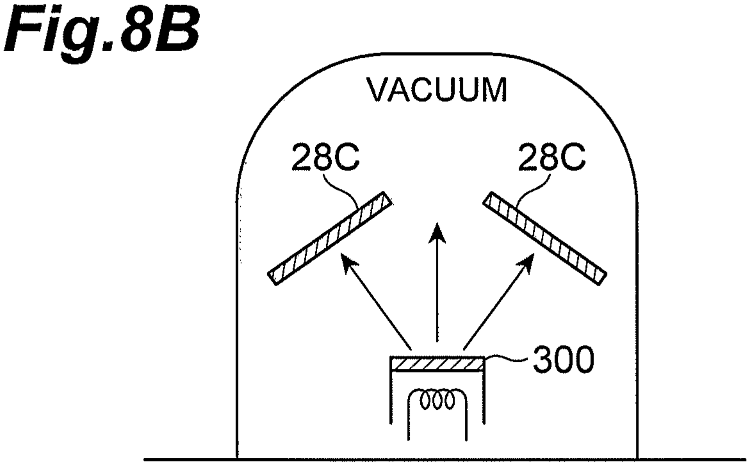
Figure 8C:
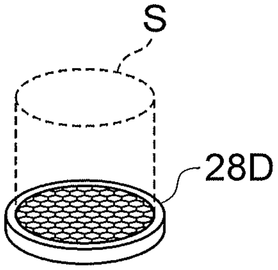

Subsequently, the tapering process is carried out for each channel opening in the MCP slice 28A of the double cladding structure manufactured as described above. FIGS. 8A to 8C are drawings for explaining the tapering process of the channel openings in the double cladding MCP of the embodiment.

Specifically, the MCP slice 28A of the double cladding structure manufactured as described above is immersed on its entrance end face side in an etchant 310, as shown in FIG. 8A. The etchant 310 is preferably, for example, any one of hydrochloric acid, nitric acid, sulfuric acid, phosphoric acid, and mixture solutions of these acids. The etchant 310 may be hydrofluoric acid or a compound thereof. Furthermore, the etchant 310 may also be an aqueous alkali solution. The openings of the channels are etched near the entrance end face as described above, thereby obtaining an MCP slice 28B in which the opening ends of the channels are processed in a taper shape, for example, as shown in FIG. 3B. In passing, the tapering process of the channel openings may be carried out before the coring process of the MCP slice 28 (FIG. 5H).

The MCP slice 28B obtained through the coring process and the tapering process of channel openings is put in an electric furnace and heated in a hydrogen atmosphere to be subjected to a reduction treatment (cf. FIG. 5I). This process reduces PbO on the channel surfaces of the MCP slice 28B (inside surfaces of the secondary electron emitting layers) to Pb, obtaining an MCP slice 28C.

Furthermore, a high-δ substance 300 is evaporated on the entrance end face of the MCP slice 28C, as shown in FIG. 8B, thereby obtaining an MCP slice 28D, for example, in the sectional shape as shown in FIG. 3A, near the opening end of each channel. The high-δ substance 300 can also be formed over the entire channels including areas near the opening ends, by atomic layer deposition (ALD). In this case, since the high-δ substance 300 is deposited evenly in a desired thickness over the entire channels including the areas near the opening ends, charge-up can be readily controlled by control of the film thickness. An effective surface of the glass main body shown in FIG. 8C (a surface contributing to electron multiplication, where the plurality of channels are formed) is the entrance end face S of the MCP. Finally, a metal for electrodes is evaporated on both sides of the MCP slice 28D (not shown), obtaining the MCP 200.

Figure 9:
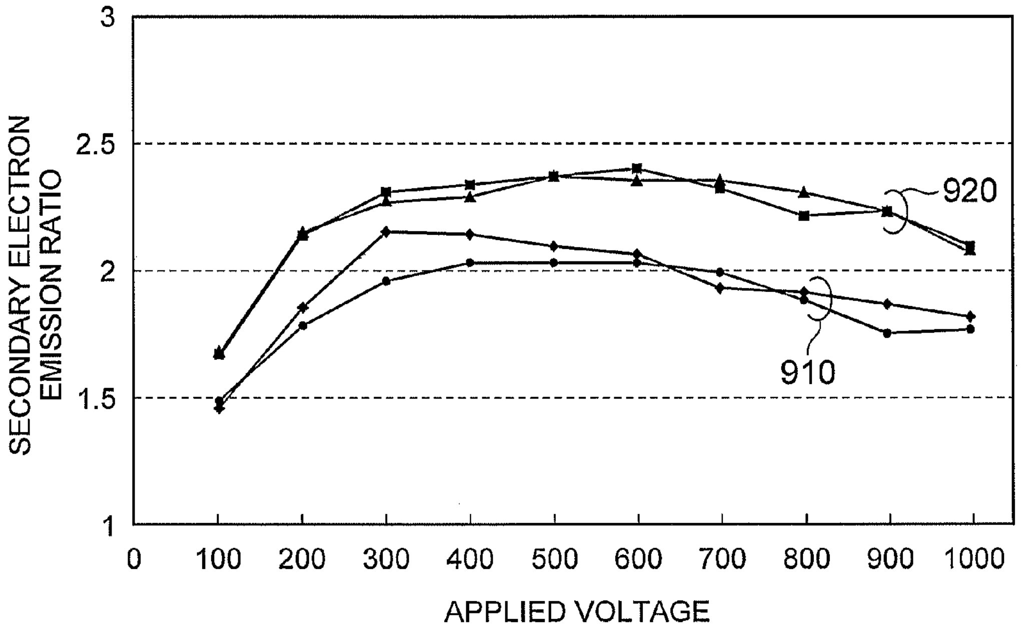
FIG. 9 is graphs for explaining changes of secondary electron emission characteristics due to surface oxidation.

FIG. 9 is graphs for explaining changes of secondary electron emission characteristics due to surface oxidation. Particularly, graphs G910 indicate the secondary electron emission characteristics about two types of samples of MCP 200 of the embodiment manufactured as described above, and graphs 920 the secondary electron emission characteristics about two types of samples of MCP 200 each of which was oxidized by baking in vacuum. As also seen from this FIG. 9, it is found that the surface oxidation improves the secondary electron emission ratio of MCP and, as a result, the detection efficiency also improves.

The MCP 200 of the embodiments with the above-described structures can be applied to a variety of devices. For example, FIG. 10A is a drawing showing a sectional structure of an image intensifier to which the MCP of the embodiment can be applied.

Figure 10A:
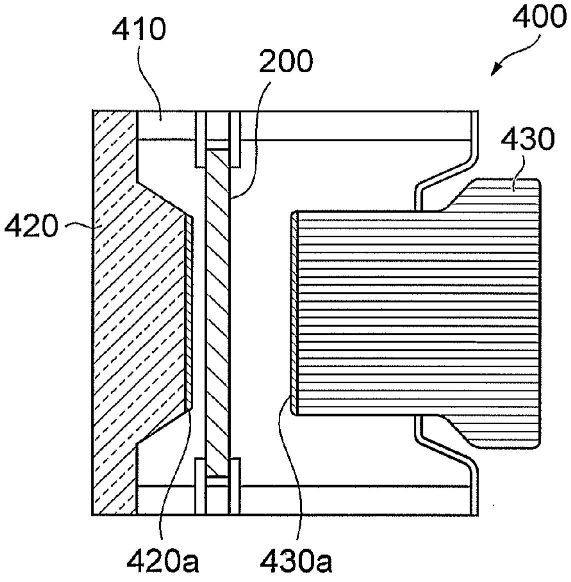
FIG. 10A is a drawing showing a sectional view of an image intensifier to which the MCP according to the present embodiment can be applied, and FIG. 10B a conceptual drawing showing a configuration of a mass spectrometer as an inspection device to which the MCP according to the present embodiment can be applied.

As shown in FIG. 10A, the image intensifier 400 is provided with a ceramic vacuum container 410, an entrance plate 420 set at one opening end of the vacuum container 410, a fiber optic plate (FOP) 430 set at the other opening end of the vacuum container 410, and the MCP 200 located between the entrance plate 420 and the FOP 430. A photocathode 420*a* for converting light into electrons is formed on an inside surface of the entrance plate 420 (on the interior side of the vacuum container 410) and a phosphor screen 430*a* is formed on an entrance surface of the FOP 430. Particularly, the image intensifier 400 is designed so as to locate the MCP 200 in close proximity to the phosphor screen 430*a* for converting electrons into light, thereby to obtain an image without distortion in the peripheral region.

Figure 10B:
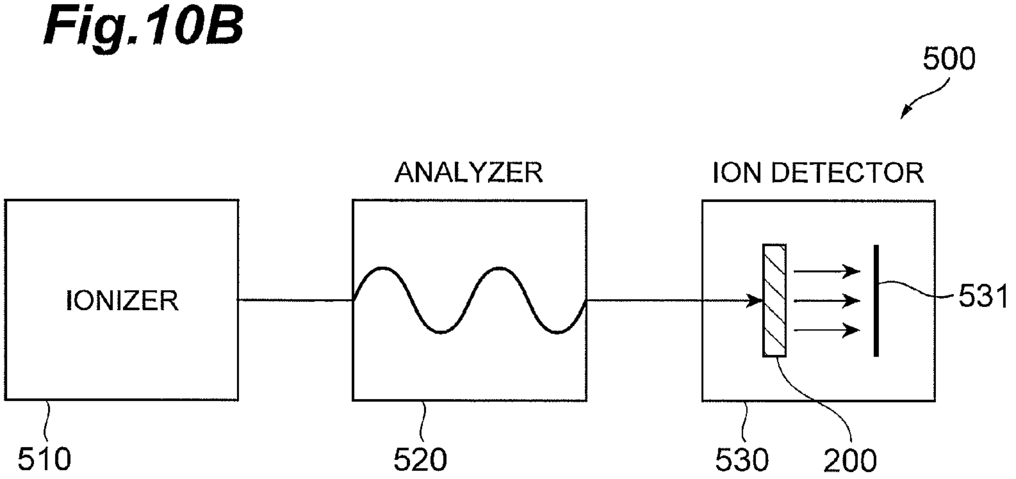

Furthermore, the MCPs of the embodiments are also applicable to the inspection equipment such as the mass spectrometer, photoelectron spectrometer, electron microscope, and photomultiplier tube, as well as the foregoing image intensifier (FIG. 10A). FIG. 10B is a conceptual drawing showing a configuration of a mass spectrometer, as an example of the inspection equipment.

The mass spectrometer 500, as shown in FIG. 10B, is composed of an ionization unit 510 to ionize a specimen, an analysis unit 520 to separate the ionized specimen into ions according to a mass charge ratio, and an ion detection unit 530 to detect the ions having passed the analysis unit 520. The ion detection unit 530 is provided with the MCP 200 of the embodiment, and an anode plate 531. For example, the MCP 200 of the embodiment functions as an electron multiplier which emits secondary electrons in response to incident ions. The anode plate 531 extracts the secondary electrons emitted from the MCP, as a signal.

Furthermore, in the double cladding MCP, the first cladding glasses have the circular inner periphery (sectional shape of the channel openings) and the hexagonal outer periphery and the second cladding glass has the inner and outer peripheries both being hexagonal, which decreases the area of the second cladding so as to increase the channel open area ratio. Yet furthermore, since the outer periphery of the first cladding glasses and the inner and outer peripheries of the second cladding glass are of identical shape, the first cladding glasses are clearly obliquely etched along the shape of the second cladding glass on the entrance end face side of the MCP. For this reason, states after the etching at the interfaces between the first and second cladding glasses become uniform among the channels. Since thermionic emission is suppressed, we can expect an effect of noise reduction and degradation of physical strength can also be suppressed. In the structure shown in FIG. 2A, thicknesses of portions of the second cladding glass covering the first cladding glass are uneven and the states after the etching at the interfaces between the first and second cladding glasses become uneven.

It is noted that, as well as the entrance face side, the exit face side of the microchannel plate may also be processed in the taper shape in the same manner as the entrance face is. The detection efficiency is further improved by processing both of the entrance surface and the exit surface in the taper shape.

From the above description of the present invention, it will be obvious that the invention may be varied in many ways. Such variations are not to be regarded as a departure from the spirit and scope of the invention, and all improvements as would be obvious to those skilled in the art are intended for inclusion within the scope of the following claims.

What is claimed is:

1. A microchannel plate comprising a main body comprised of lead glass which exhibits electric insulation before a reduction treatment and exhibits electric conduction after the reduction treatment, wherein the main body comprises:

first cladding glasses each of which has a through hole extending along a predetermined direction and provided for defining a channel wall, said first cladding glasses having a predetermined acid resistance; and a second cladding glass which functions as a main electroconductive part and is located at least in part in spaces among outer peripheral surfaces of the first cladding glasses in a state in which the second cladding glass is in contact with the outer peripheral surfaces of the respective first cladding glasses, said second cladding glass having an acid resistance higher than the acid resistance of the first cladding glasses, wherein on an entrance end face side of the microchannel plate, an opening end of the through hole in each of the first cladding glasses is processed in a taper shape, and wherein in a cross section of the microchannel plate perpendicular to the predetermined direction, the second cladding glass has a constant width and outer peripheries of the first cladding glasses are deformed in a hexagonal shape whereby the second cladding glass constitutes a honeycomb structure.

2. The microchannel plate according to claim 1, wherein an area ratio of the first cladding glasses in the entrance end face of the main body is larger than an area ratio of the second cladding glass in the entrance end face.

3. The microchannel plate according to claim 1, wherein an area ratio before a tapering process of the first cladding glasses in the entrance end face of the main body is in the range of 60% to 90%.

4. The microchannel plate according to claim 1, wherein a taper angle, which is defined as an angle between a central axis of the through hole for defining a channel, and a tapered face located at an opening end of the through hole, is preferably in the range of 10° to 50°.

5. The microchannel plate according to claim 1, wherein as any one of a resistance to hydrochloric acid, a resistance to nitric acid, a resistance to sulfuric acid, a resistance to phosphoric acid, a resistance to a mixture solution of at least two of these hydrochloric acid, nitric acid, sulfuric acid, and phosphoric acid, a resistance to hydrogen fluoride, and a resistance to a compound of hydrogen fluoride, the acid resistance before the reduction treatment of the second cladding glass is higher than the acid resistance before the reduction treatment of the first cladding glasses.

6. An image intensifier comprising the microchannel plate as defined in claim 1.

7. An ion detector comprising the microchannel plate as defined in claim 1.

8. An inspection device comprising the ion detector of claim 7.

9. The inspection device according to claim 8, the inspection device including a mass spectrometer, a photoelectron spectrometer, an electron microscope, or a photomultiplier tube.

10. A microchannel plate comprising a main body comprised of lead glass which exhibits electric insulation before a reduction treatment and exhibits electric conduction after the reduction treatment, wherein the main body comprises:

first cladding glasses each of which has a through hole extending along a predetermined direction and provided for defining a channel wall, said first cladding glasses having a predetermined acid resistance;

a second cladding glass which functions as a main electroconductive part and is located at least in part in spaces among outer peripheral surfaces of the first cladding glasses in a state in which the second cladding glass is in contact with the outer peripheral surfaces of the respective first cladding glasses, said second cladding glass having an acid resistance higher than the acid resistance of the first cladding glasses; and a coating material comprised of a high-δ substance, which is provided on an entrance end face of the microchannel plate, wherein on an entrance end face side of the microchannel plate, an opening end of the through hole in each of the first cladding glasses is processed in a taper shape, wherein in a cross section of the microchannel plate perpendicular to the predetermined direction, the second cladding glass has a constant width and outer peripheries of the first cladding glasses are deformed in a hexagonal shape whereby the second cladding glass constitutes a honeycomb structure, and wherein on the entrance end face of the microchannel plate, the coating material covers at least a part of the tapered opening of the through hole in each of the first cladding glasses in a state in which the coating material covers an entire end face of the second cladding glass.

11. The microchannel plate according to claim 10, wherein the high-δ substance contains any one of MgO, $MgF_2$, $Al_2O_3$, $SiO_2$, CsI, KBr, SrO, $Y_2O_3$, $B_2O_3$, and NaCl.

12. The microchannel plate according to claim 10, wherein an area ratio of the first cladding glasses in the entrance end face of the main body is larger than an area ratio of the second cladding glass in the entrance end face.

13. The microchannel plate according to claim 10, wherein an area ratio before a tapering process of the first cladding glasses in the entrance end face of the main body is in the range of 60% to 90%.

14. The microchannel plate according to claim 10, wherein a taper angle, which is defined as an angle between a central axis of the through hole for defining a channel, and a tapered face located at an opening end of the through hole, is preferably in the range of 10° to 50°.

15. The microchannel plate according to claim 10, wherein as any one of a resistance to hydrochloric acid, a resistance to nitric acid, a resistance to sulfuric acid, a resistance to phosphoric acid, a resistance to a mixture solution of at least two of these hydrochloric acid, nitric acid, sulfuric acid, and phosphoric acid, a resistance to hydrogen fluoride, and a resistance to a compound of hydrogen fluoride, the acid resistance before the reduction treatment of the second cladding glass is higher than the acid resistance before the reduction treatment of the first cladding glasses.

16. An image intensifier comprising the microchannel plate as defined in claim 10.

17. An ion detector comprising the microchannel plate as defined in claim 10.

18. An inspection device comprising the ion detector of claim 17.

19. The inspection device according to claim 18, the inspection device including a mass spectrometer, a photoelectron spectrometer, an electron microscope, or a photomultiplier tube.

20. The microchannel plate according to claim 1, wherein deformation points of the first cladding glasses and the second cladding glass are equal or close to each other.

21. The microchannel plate according to claim 1, wherein the second cladding glass has inner walls each of which is in contact with the outer peripheral surface of an associated one of the first cladding glasses, and wherein in the cross section of the microchannel plate, parts of the channel wall are in contact with an associated inner wall of the second cladding glass at different positions of the associated inner wall.

22. The microchannel plate according to claim 10, wherein deformation points of the first cladding glasses and the second cladding glass are equal or close to each other.

23. The microchannel plate according to claim 10, wherein the second cladding glass has inner walls each of which is in contact with the outer peripheral surface of an associated one of the first cladding glasses, and wherein in the cross section of the microchannel plate, parts of the channel wall are in contact with an associated inner wall of the second cladding glass at different positions of the associated inner wall.

* * * * *